US008700262B2

(12) United States Patent
Boissonnier et al.

(10) Patent No.: US 8,700,262 B2
(45) Date of Patent: Apr. 15, 2014

(54) STEERING WHEEL CONTROLS

(75) Inventors: Kimo Boissonnier, Tampere (FI); Jörg Brakensiek, Mountain View, CA (US)

(73) Assignee: Nokia Corporation, Espoo (FI)

( * ) Notice: Subject to any disclaimer, the term of this patent is extended or adjusted under 35 U.S.C. 154(b) by 602 days.

(21) Appl. No.: 12/966,703

(22) Filed: Dec. 13, 2010

(65) Prior Publication Data

US 2012/0150388 A1   Jun. 14, 2012

(51) Int. Cl.
*G06F 17/00*   (2006.01)

(52) U.S. Cl.
USPC ............... 701/41; 701/36; 701/49; 710/1

(58) Field of Classification Search
None
See application file for complete search history.

(56) References Cited

U.S. PATENT DOCUMENTS

| | | | | |
|---|---|---|---|---|
| 5,808,374 A * | 9/1998 | Miller et al. | ................ | 307/10.1 |
| 6,157,372 A * | 12/2000 | Blackburn et al. | ............ | 345/173 |
| 6,373,472 B1 * | 4/2002 | Palalau et al. | ................. | 345/173 |
| 6,418,362 B1 * | 7/2002 | St. Pierre et al. | ............... | 701/36 |
| 6,438,465 B2 * | 8/2002 | Obradovich et al. | ............ | 701/1 |
| 6,703,999 B1 * | 3/2004 | Iwanami et al. | .............. | 345/158 |
| 7,126,583 B1 * | 10/2006 | Breed | ........................... | 345/158 |
| 7,158,871 B1 * | 1/2007 | Ilan et al. | ......................... | 701/49 |
| 7,239,096 B2 * | 7/2007 | Hancock et al. | ................ | 318/59 |
| 7,242,112 B2 | 7/2007 | Wolf et al. | | |
| 7,410,202 B2 * | 8/2008 | Rose et al. | ................. | 296/146.2 |
| 7,663,047 B2 | 2/2010 | Hanuschak | | |
| 7,834,857 B2 * | 11/2010 | Prados | ........................... | 345/173 |
| 8,026,902 B2 * | 9/2011 | Medler et al. | ................ | 345/173 |
| 8,058,577 B2 * | 11/2011 | Tissot | ........................... | 200/334 |
| 8,199,111 B2 * | 6/2012 | Aimi et al. | ..................... | 345/168 |
| 8,229,603 B2 * | 7/2012 | Miyata et al. | .................... | 701/1 |
| 8,309,870 B2 * | 11/2012 | Peterson et al. | .............. | 200/344 |
| 8,390,422 B2 * | 3/2013 | Laurent et al. | .................. | 338/47 |
| 8,405,618 B2 * | 3/2013 | Colgate et al. | ............... | 345/173 |
| 8,406,961 B2 * | 3/2013 | Pathak et al. | ................... | 701/48 |
| 8,433,470 B1 * | 4/2013 | Szybalski et al. | .............. | 701/23 |

(Continued)

FOREIGN PATENT DOCUMENTS

| | | |
|---|---|---|
| DE | 19927464 | 9/2008 |
| EP | 1321346 | 6/2003 |

(Continued)

OTHER PUBLICATIONS

O. Palinko and A.L. Kun, "Steering Wheel Sensor As a Push-To-Talk Solution", 2008, 4 pages.

(Continued)

*Primary Examiner* — Jonathan M Dager
(74) *Attorney, Agent, or Firm* — Locke Lord LLP

(57) ABSTRACT

A method where vibration information is received from a plurality of vibration sensors fixed to a steering wheel at given positions of the steering wheel. It is then determined, based on the received vibration information and expected propagation of vibration along the steering wheel, whether a user has caused vibration to the steering wheel and at which section of the steering wheel the vibration is caused. The section of the steering wheel where the vibration is caused to the steering wheel is referred to as a touch section. Responsive to the determination of the touch section, a user command is determined and a corresponding control command is sent to a controllable device so that a user can command the controllable device in a desired manner e.g. by tapping a particular section of the steering wheel.

20 Claims, 4 Drawing Sheets

(56) References Cited

U.S. PATENT DOCUMENTS

| | | | |
|---|---|---|---|
| 8,433,481 B2* | 4/2013 | Yoshida et al. | 701/49 |
| 2004/0030807 A1* | 2/2004 | Wessler et al. | 710/1 |
| 2004/0122572 A1* | 6/2004 | Ichinose | 701/36 |
| 2005/0052426 A1* | 3/2005 | Hagermoser et al. | 345/173 |
| 2005/0143870 A1* | 6/2005 | Yoshio et al. | 701/2 |
| 2006/0047386 A1* | 3/2006 | Kanevsky et al. | 701/36 |
| 2007/0057922 A1* | 3/2007 | Schultz et al. | 345/173 |
| 2007/0236472 A1* | 10/2007 | Bentsen et al. | 345/173 |
| 2008/0109132 A1* | 5/2008 | Yukawa et al. | 701/36 |
| 2008/0174415 A1* | 7/2008 | Tanida et al. | 340/438 |
| 2008/0243333 A1* | 10/2008 | Uchiyama et al. | 701/36 |
| 2008/0309634 A1* | 12/2008 | Hotelling et al. | 345/173 |
| 2009/0322499 A1* | 12/2009 | Pryor | 340/407.2 |
| 2010/0302016 A1* | 12/2010 | Zaborowski | 340/407.2 |
| 2011/0148774 A1* | 6/2011 | Pihlaja | 345/173 |
| 2013/0024071 A1* | 1/2013 | Sivertsen | 701/41 |

FOREIGN PATENT DOCUMENTS

| | | |
|---|---|---|
| JP | 2000228126 | 8/2000 |
| WO | WO2006025891 | 3/2006 |
| WO | WO2008125640 | 10/2008 |

OTHER PUBLICATIONS

Commission of the European Communities, "Commission Recommendation of Dec. 22, 2006 on Safe and Efficient In-Vehicle Information and Communication Systems: Update of the European Statement of Principles on Human Machine Interface", Brussels, Dec. 22, 2006, 53 pages.

* cited by examiner

STEERING WHEEL CONTROLS

TECHNICAL FIELD

The present invention generally relates to steering wheel controls.

BACKGROUND ART

Motor vehicles such as cars and lorries are ever more richly equipped with a variety of functions and accessories. The safety is still the overriding principle. Therefore, particular attention is paid on the user interfaces. One common development is that the steering wheels often sport different controls for use of car radio and cruise control functions, for example. In other applications e.g. in mobile phones, it is possible to layer different functions into menu structures. Such menus are, however, poorly suited for use for a driver of a car for safety considerations. At the same time, the cost pressures in car industry have been mounting, which causes a continuous need to cut costs wherever possible. Multi-function steering wheels are relatively expensive because of the complexities caused by cabling and because a multitude of durable and reliable buttons are needed.

SUMMARY

According to a first example aspect of the invention there is provided an apparatus comprising:
a plurality of vibration sensors configured for fixing to a steering wheel at given positions of the steering wheel; and
a controller communicatively configured to receive vibration information from the vibration sensors and to determine, based on the received vibration information and expected propagation of vibration along the steering wheel, whether a user has caused vibration to the steering wheel and at which section of the steering wheel the vibration has been caused; wherein
the section of the steering wheel where the vibration has been caused to the steering wheel is a touch section; and
the controller is further configured responsive to the determination of the touch section to:
determine a user command; and
send to a controllable device a control command corresponding to the user command.

The vibration sensors may comprise piezo-electric sensors and/or microphones.

The vibration sensors may be fixed to a rim of the steering wheel. The vibration sensors may be fixed permanently or detachably. The vibration sensors may be positioned so that vibration from each different section of the steering wheel produces a unique combination of vibration information produced by the vibration sensors.

The apparatus may further comprise a noise detection sensor. The noise detection sensor may be operationally and/or structurally similar to the vibration sensors. The controller may be further configured to perform adaptive filtering to compensate for noise caused by normal vibrations that are carried by the steering column to the steering wheel.

The controller may comprise one or more physical processing units. The processing units may comprise one or more similar or different units selected from the group consisting of: a central processing unit; a master control unit; a digital signal processor; an application specific integrated circuit; a field programmable gate array; and a microcontroller.

The sections of the steering wheel may refer to sections of the rim of the steering wheel. The sections may also comprise spokes or other intermediary elements that connect the rim to a steering shaft.

The sections may be defined relative to the orientation of the steering wheel. Alternatively, the sections may be defined relative to a reference other than the steering wheel. The reference may be the body of a vehicle to which the steering wheel is installed. Alternatively, the reference may be the gravitational field.

The controller and/or the vibration sensors may be configured to detect vibration that exceeds a given threshold. The controller may be configured to determine tapping of the steering wheel and the touch section based on time difference of arrival as measured by different ones of the vibration sensors. The time difference may be measured from detected up and/or down ramps in the vibration information produced by different vibration sensors. Alternatively, the controller may be configured to compare outputs of different vibration sensors in frequency domain.

The apparatus may be incorporated with a steering wheel cover for installation onto an existing steering wheel.

The control command may comprise one or more of the following: select next song or channel; select previous song or channel; fast forward; fast backward; volume up; volume down; mute; release mute; answer phone; end call; select audio source; increase heating; decrease heating; activate navigation; deactivate navigation; select navigation target; show current location; turn on spoken feedback; turn off spoken feedback; switch on traffic announcements; switch off traffic announcements; and query currently effective traffic speed limits and/or parking rules.

In general, the control commands may enable or disable a specific service or application, or a sub-functionality within a service or application.

In addition, the touch section may correspond to a predetermined user command. Alternatively, the touch section may correspond to a context-sensitive user command. In this latter case, context-indicative information may be presented on a display (e.g. in an instrument panel) or by audible information.

A portable device may operate as the controller. The portable device may be selected from a group consisting of: a mobile phone, a personal digital assistant, a game device, and a navigation device. The portable device may configured to be mounted to the steering wheel. Alternatively or additionally, the apparatus may comprise a clamp or connector configured to releasable attach the portable device to the steering wheel. The portable device may contain the vibration sensors.

The apparatus may comprise a feedback transducer configured to output a user perceivable feedback signal in response to the determining of the user command. The feedback transducer may comprise a vibrator. The feedback transducer may comprise a loudspeaker.

The apparatus may be configured to provide a feedback signal via the controllable device in response to the determining of the user command. The controllable device may be a car media player such as a car radio.

According to a second example aspect of the invention there is provided a method comprising:
receiving vibration information from a plurality of vibration sensors fixed to a steering wheel at given positions of the steering wheel; and
determining, based on the received vibration information and expected propagation of vibration along the steering wheel, whether a user has caused vibration to the steering wheel and at which section of the steering wheel the vibration has been caused; wherein the section of the steering wheel where the vibration has been caused to the steering wheel is a touch section; and responsive to the determination of the touch section:
   determining a user command; and
   sending to a controllable device a control command corresponding to the user command.

According to a third example aspect of the invention there is provided an apparatus comprising:

means for receiving vibration information from a plurality of vibration sensors fixed to a steering wheel at given positions of the steering wheel; and means for determining, based on the received vibration information and expected propagation of vibration along the steering wheel, whether a user has caused vibration to the steering wheel and at which section of the steering wheel the vibration has been caused; wherein the section of the steering wheel where the vibration has been caused to the steering wheel is a touch section; and the apparatus further comprises means for, responsive to the determination of the touch section:
   determining a user command; and
   sending to a controllable device a control command corresponding to the user command.

According to a fourth example aspect of the invention there is provided a computer program product comprising a non-transitory computer readable medium having computer executable program code stored thereon, which when executed by at least one processor causes an apparatus at least to perform:

receiving vibration information from a plurality of vibration sensors fixed to a steering wheel at given positions of the steering wheel; and determining, based on the received vibration information and expected propagation of vibration along the steering wheel, whether a user has caused vibration to the steering wheel and at which section of the steering wheel the vibration has been caused; wherein the section of the steering wheel where the vibration has been caused to the steering wheel is a touch section; and the computer readable medium further having computer executable program code stored thereon, which when executed by the at least one processor causes the apparatus at least to perform, responsive to the determination of the touch section:
   determining a user command; and
   sending to a controllable device a control command corresponding to the user command.

The computer executable program code may be stored on a memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which.

DETAILED DESCRIPTION

In the following description, like reference signs denote like elements.

Figure 1:
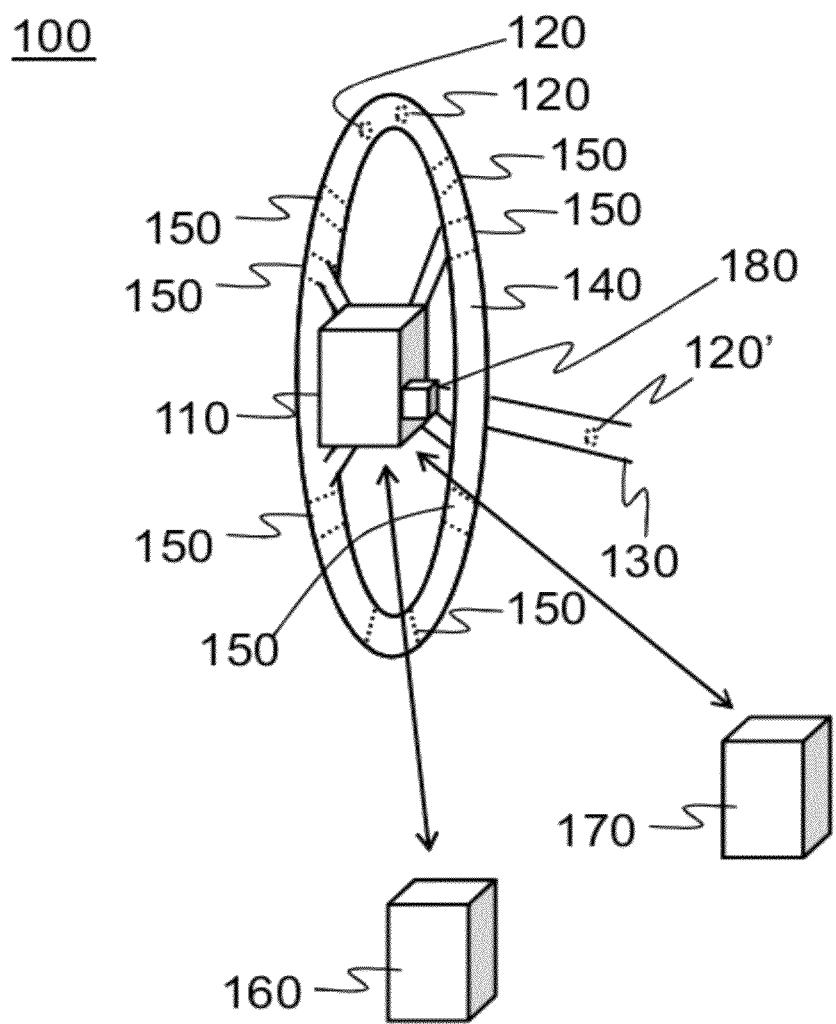
FIG. 1 shows a schematic picture of a system according to an example embodiment.

FIG. 1 shows a schematic picture of a system 100 according to an example embodiment of the invention. The system comprises an apparatus for implementing a multifunction steering wheel. The apparatus comprises a controller 110, two or more vibration sensors 120 and optionally a noise detection sensor 120'. The vibration sensors 120 are mounted to a steering wheel 140 that is coupled to a steering shaft or steering column 130. The steering column conducts normal vibrations of a car to the steering wheel mounted vibration sensors and for eliminating or compensating of such noise the noise detection sensor 120' may be fixed to the steering column. The controller 110 is drawn onto the hub of the steering wheel 140 in sake of simplicity only; normally that region is reserved for an airbag and the controller 110 is rather located in or behind the hub of the steering wheel 140. The vibration sensors 120 and the noise detection sensor 120' are typically communicatively connected to the controller 110 by wired connections.

Moreover, the system 100 depicts two auxiliary control units 160 and 170, which represent various possible devices that may be controlled by the controller 110. These auxiliary control units 160, 170 may belong or control any of in-car navigation systems, media players, mobile communication units, cabin temperature control and the like. The multifunction steering wheel 140 may be used solely for controlling such functions which are not essential for safety. In some embodiments, the multifunction steering when may also control functions such as cruise control, headlights or gear shifting.

The vibration sensors 120 may comprise piezo-electric sensors and/or microphones.

The vibration sensors 120 may be fixed to a rim of the steering wheel 140. The vibration sensors 120 may be fixed permanently or detachably. The vibration sensors 120 may be positioned so that vibration from each different section of the steering wheel 140 produces a unique combination of vibration information produced by the vibration sensors.

The sections of the steering wheel 140 may refer to sections of the rim of the steering wheel 140. The sections may also comprise spokes or other intermediary elements that connect the rim to a steering shaft.

The controller 110 and/or the vibration sensors 120 may be configured to detect vibration that exceeds a given threshold. The controller 110 may be configured to determine tapping of the steering wheel 140 and the touch section based on time difference of arrival as measured by different ones of the vibration sensors 120. The time difference may be measured from detected up and/or down ramps in the vibration information produced by different vibration sensors. Alternatively, the controller 110 may be configured to compare outputs of different vibration sensors 120 in frequency domain.

The system 100 may be incorporated with a steering wheel cover for installation onto an existing steering wheel 140.

The system 100 may further comprise an orientation detector 180 configured to detect the orientation of the multifunction steering wheel in relation to a vehicle in which the system 100 is mounted. The orientation detector may comprise, for instance, an angle sensor that detects the turning angle of the steering wheel 140 with respect to the steering column's non-rotating body. The orientation detector may also be configured to detect the orientation with respect to the gravitation field of the Earth. It is also possible that the orientation detector is configured to receive an indication of the orientation of the steering wheel from an auxiliary system. For instance, many cars have a variable force power steering system which may measure the extent to which the steering wheel is rotated.

Figure 2:
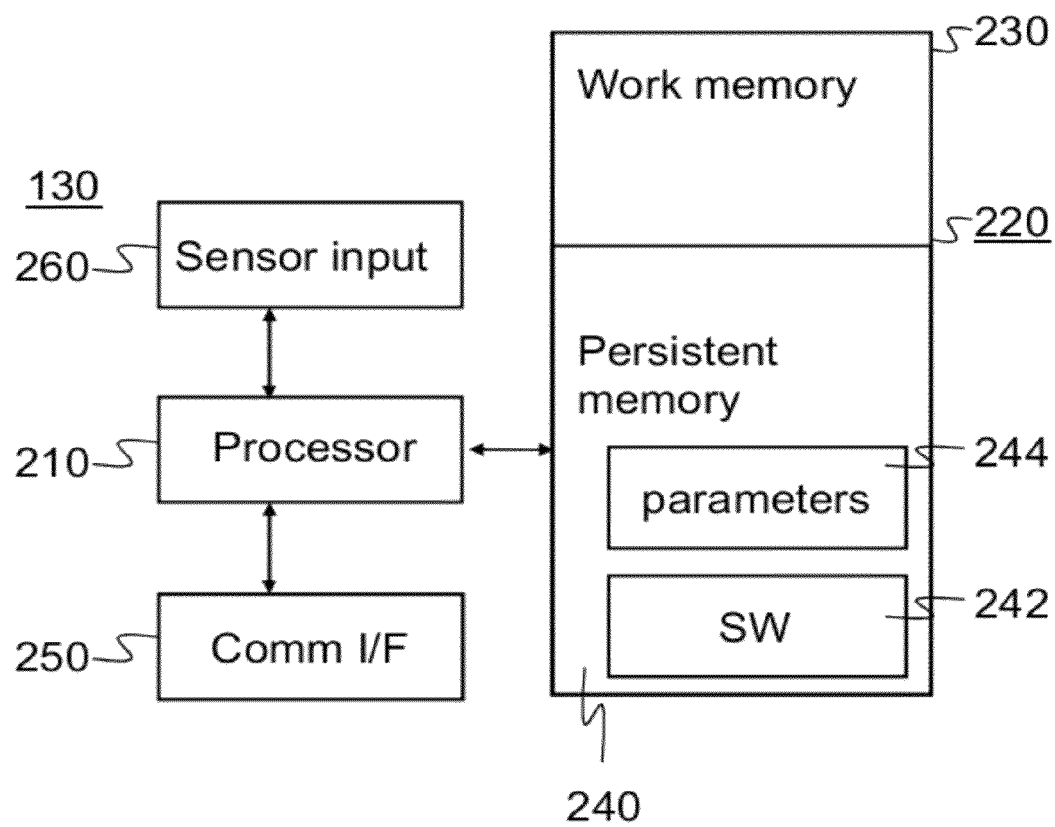
FIG. 2 presents an example block diagram of a controller suited for use e.g. in the example embodiment of FIG. 1.

FIG. 2 presents an example block diagram of a controller 110 suited for use e.g. in the example embodiment of FIG. 1. The controller 110 comprises a communication interface module 250, a processor 210 coupled to the communication interface module 250, and a memory 220 coupled to the processor 210. The apparatus further comprises software 230 stored in the memory 220 and operable to be loaded into and executed in the processor 210. The software 230 may comprise one or more software modules and can be in the form of a computer program product that is software stored in a memory medium. The controller 110 further comprises a sensor input coupled to the vibration sensors 120 and to the noise detection sensor 120' and to the processor 210.

The communication interface module 250 is configured to provide local communications over one or more local links with the auxiliary control units 160, 170. The local links may be wired and/or wireless links. The communication interface module 250 may further implement telecommunication links suited for establishing links with other users or for data transfer (e.g. using the Internet). Such telecommunication links may be links using any of: wireless local area network links, Bluetooth, ultra-wideband, cellular or satellite communication links. The communication interface module 250 may be integrated into the controller 110 or into an adapter, card or the like that may be inserted into a suitable slot or port of the controller 110. While FIG. 2 shows one communication interface module 250, the controller 110 may comprise a plurality of communication interface modules 250.

The processor 210 may be, e.g., a central processing unit (CPU), a microprocessor, a digital signal processor (DSP), a graphics processing unit, an application specific integrated circuit (ASIC), a field programmable gate array, a microcontroller 110 or a combination of such elements. FIG. 2 shows one processor 210, but the controller 110 may comprise a plurality of processors.

The memory 220 may be for example a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The controller 110 may comprise a plurality of memories. The memory 220 may be constructed as a part of the controller 110 or it may be inserted into a slot, port, or the like of the controller 110 by a user. The memory 220 may serve the sole purpose of storing data, or it may be constructed as a part of an apparatus serving other purposes, such as processing data.

A skilled person appreciates that in addition to the elements shown in FIG. 2, the controller 110 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the controller 110 may comprise a disposable or rechargeable battery (not shown) for powering the controller 110 when external power if external power supply is not available.

Figure 3:
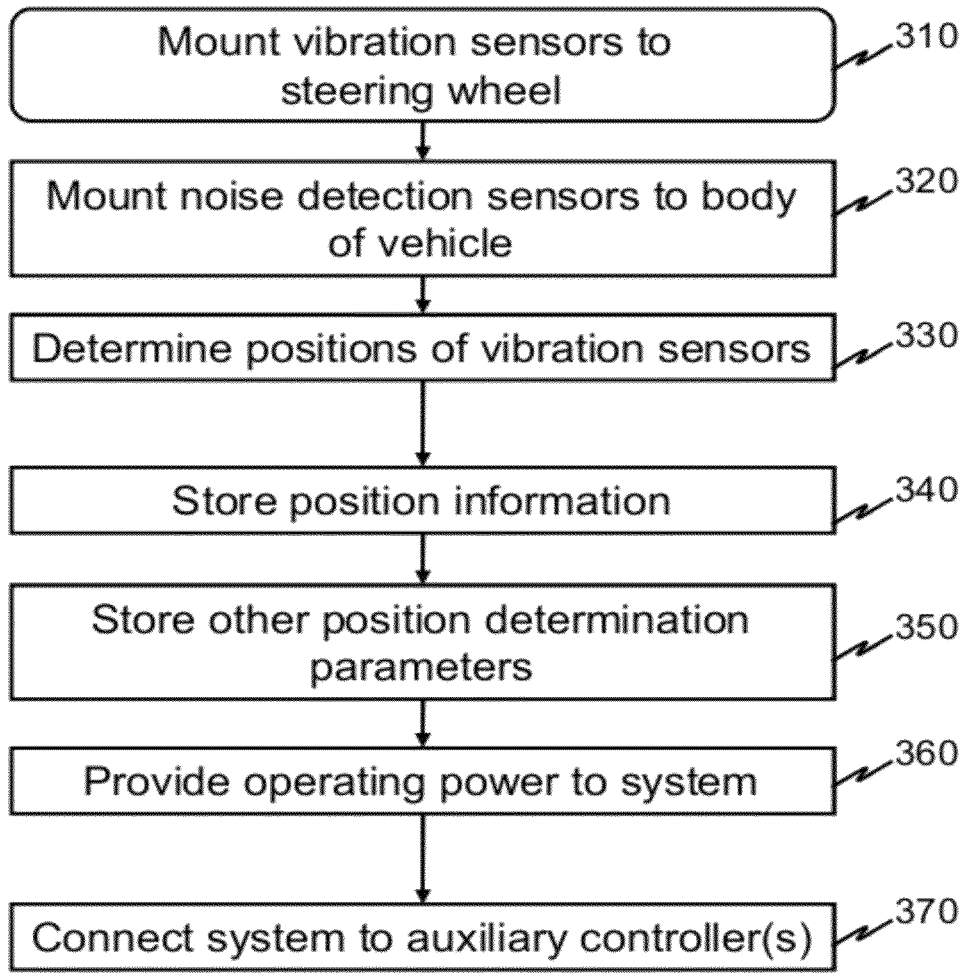
FIG. 3 presents a process for building of a system according to an example embodiment.

FIG. 3 presents a process 300 for building of a system 100 according to an example embodiment. The system 100 is produced either on manufacturing of a car or thereafter so that the vibration sensors 120 are mounted 310 to the steering wheel 140 or more particularly to the rim of the steering wheel 140. On manufacturing of the steering wheel the sensors 120 may be housed by the core of the rim or within a cushion layer that surrounds the core of the steering wheel 140. In case of later installation e.g. by the user, the vibration sensors 120 may be attached to the rim by a cover (not shown). The cover may be a decorative or protective cover or the cover may merely serve the function of attaching the vibration sensors 120 to the steering wheel. The noise detection sensor 120' is also mounted 320 to the body of the vehicle to which the system 100 is mounted or to a part that links said body and the steering wheel 140. The position of the vibration sensors 120 is determined 330. The determining of the position of the vibration sensors 120 may involve determining mutual distances of the vibration sensors 120 along the rim of the steering wheel 140, in both clockwise and counterclockwise direction and resulting position information is stored 340 in the memory 240 (among parameters 244). Also other position determination parameters are stored 350 in the memory 240 among parameters 244. The position determination parameters may comprise, for instance, the propagation speed of vibration in the rim of the steering wheel 140, threshold levels for detecting tapping on the steering wheel, noise processing parameters, and/or wave patters representative of different sections of the steering wheel as measured by the vibration sensors 120. The system 100 is powered 360 e.g. by replaceable batteries, solar cell charged battery, vibration charged battery, or by connecting to electric system of the car to which the steering wheel is mounted. The system 100 is connected 370 to one or more auxiliary control units 160, 170 and the vibration sensors 120 and the noise detection sensor 120' are connected to the sensor input 260.

The control command may comprise one or more of the following: select next song or channel; select previous song or channel; fast forward; fast backward; volume up; volume down; mute; release mute; answer phone; end call; select audio source; increase heating; decrease heating; activate navigation; deactivate navigation; select navigation target; show current location; turn on spoken feedback; turn off spoken feedback; switch on traffic announcements; switch off traffic announcements; and query currently effective traffic speed limits and/or parking rules.

In general, the control commands may be configured to enable or disable a specific service or application, or a sub-functionality within a service or application.

In addition, the touch section may correspond to a predetermined user command. Alternatively, the touch section may correspond to a context-sensitive user command. In this latter case, context-indicative information may be presented on a display (e.g. in an instrument panel) or by audible information.

A portable device may operate as the controller 110. The portable device may be selected from a group consisting of: a mobile phone, a personal digital assistant, a game device, and a navigation device. The portable device may configured to be mounted to the steering wheel 140. Alternatively or additionally, the apparatus may comprise a clamp or connector configured to releasable attach the portable device to the steering wheel. The connector may comprise, for instance, adhesive tape, releasably attachable fixing tape, cable tie, one or more bolts or threaded elements configured to engage with corresponding elements of the steering wheel 140.

The portable device may contain the vibration sensors 120.

The system 100 may comprise a feedback transducer configured to output a user perceivable feedback signal in response to the determining of the user command. The feedback transducer may comprise a vibrator. The feedback transducer may comprise a loudspeaker. The vibration sensors 120 may be used as the feedback transducer.

The system 100 may be configured to provide a feedback signal via the auxiliary control units 160, 170 (which represent one or more controllable devices) in response to the determining of the user command. The auxiliary control unit 160 may be a car media player such as a car radio.

Figure 4:
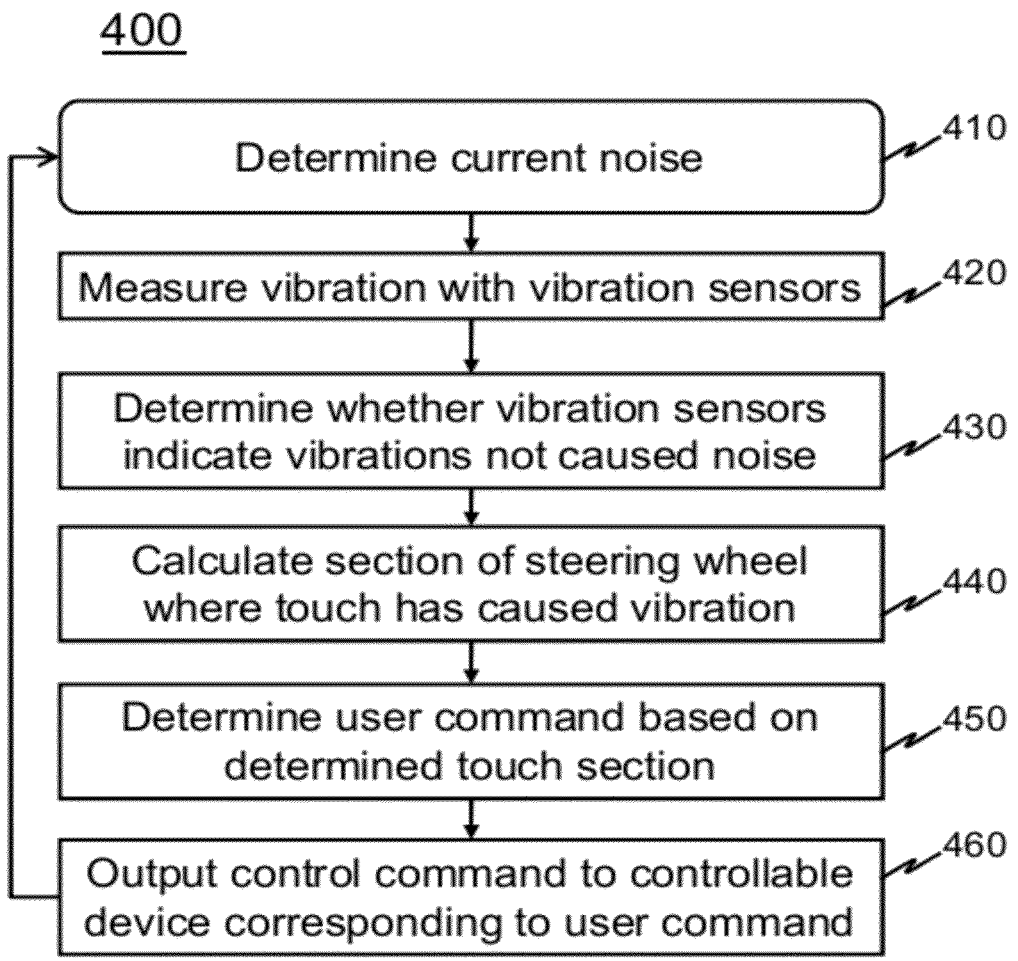
FIG. 4 presents a process illustrating operating of a system according to an example embodiment.

FIG. 4 presents a process 400 illustrating operating of a system 100 according to an example embodiment. Current noise is optionally determined 410 by the noise detection sensor 120'. Vibration of the steering wheel is measured 420 from two or more different points by the vibration sensors 120. Based on the measured vibration and optional noise determination, it is determined 430 whether the vibration sensors indicate vibrations not caused noise, for example, by using adaptive filtering for noise elimination or compensation. Subsequent or together with this step, the operation involves calculating 440 the section of steering wheel 140 where touch has caused vibration (e.g. by tapping the steering wheel). When not noise-caused vibration has been determined 430 and the touch section has been calculated, a user command is determined 450 based on said touch section. A control command is sent 460 to controllable device (e.g. auxiliary control units 160, 170) corresponding to user command.

The calculating 440 of the touch section may be based on determining up/down ramp time of a vibration pulse that propagates along the steering wheel 140. Such calculation may be implemented simply by detecting time difference between the moments at which vibration at different vibration sensors 120 exceeds a threshold level. Alternatively, the calculating 440 may compare waveform signals produced by different vibration sensors 120. The comparison of waveform signals may be implemented with commonly known techniques, for instance, frequency domain operations. In one alternative, the comparison may be implemented by producing a difference signal between each adjacent vibration sensor, optionally noise compensate the difference signal(s), and then compare the difference signals with pre-stored wave patterns that represent vibrations caused at different sections of the steering wheel 140. If a pre-stored wave pattern of one section differs from the difference signal less than by a maximum error, that section is determined to be the touch sector.

The description of the operation of the system 100 is intentionally written with an attempt to avoid defining a particular order for the different steps of FIG. 4. The flow presented in FIG. 4 represents merely one example embodiment. However, it shall be appreciated that the different steps may be combined together and, in some cases, their order may also be changed. There may also be further steps such as determining a subsequent vibration caused to the steering wheel 140 either at a common touch section with a recently determined touch section or at some other touch section. Sequences of different vibrations caused to the steering wheel 140 may be used to indicate different user commands. For instance, tapping twice one touch section may indicate inverse function to a single tapping (e.g. next song/channel by one tap at one touch section and previous song by double tapping).

In one example embodiment, the calculating 440 of the touch section may be relative to the steering wheel 140. In other words, when the steering wheel 140 is aligned for driving straight ahead, a given first touch section may reside on the bottom of the steering wheel 140 as seen by the user. However, when the steering wheel 140 is rotated by half a turn, the given first touch section would reside on the top of the steering wheel 140 as then seen by the user.

In another example embodiment, instead, the touch sections are defined with relation to the body of the car or with relation to the gravitational field. In this case, generally, the touch sections are defined so that the given first touch section would always reside on the bottom of the steering wheel 140 as seen by the user, no matter to how large an extent the steering wheel 140 is turned. In this example embodiment, the angle of the steering wheel 140 is determined with relation to the body of the vehicle or to the gravitational field resulting with an angle determination for the steering wheel 140. This angle determination is used to transpose the detected touch section that is measured relative to the steering wheel 140 into a touch section that is relative to the reference alignment. The reference alignment may be based on the body of the vehicle or on the gravitational field.

With the system 100, a user may command the controllable device in a desired manner e.g. by tapping a particular section of the steering wheel 140.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. An apparatus comprising:
   a plurality of vibration sensors configured to be fixed to a steering wheel at given positions of the steering wheel; and
   a controller communicatively configured to receive vibration information from the vibration sensors and to determine, based on the received vibration information and expected propagation of vibration along the steering wheel, whether a user has caused vibration to the steering wheel and at which section of the steering wheel the vibration has been caused; wherein
   the section of the steering wheel where the vibration has been caused to the steering wheel is a touch section; and the controller is further configured responsive to the determination of the touch section to:
  determine a user command; and
  send to a controllable device a control command corresponding to the user command.

2. The apparatus of claim 1, wherein the vibration sensors comprise at least one piezo-electric sensor.

3. The apparatus of claim 1, wherein the vibration sensors comprise at least one microphone.

4. The apparatus of claim 1, wherein the vibration sensors are fixed to a rim of the steering wheel.

5. The apparatus of claim 1, wherein the vibration sensors are positioned so that vibration from each different section of the steering wheel produces a unique combination of vibration information produced by the vibration sensors.

6. The apparatus of claim 1, wherein the controller is further configured to perform adaptive filtering to compensate for noise caused by normal vibrations that are carried by the steering column to the steering wheel.

7. The apparatus of claim 1, wherein the sections are defined relative to the orientation of the steering wheel.

8. The apparatus of claim 1, wherein the sections are defined relative to a reference selected from a group consisting of: the body of a vehicle to which the steering wheel is installed; and gravitational field.

9. The apparatus of claim 1, wherein the controller is further configured to determine tapping of the steering wheel and the touch section based on time difference of arrival as measured by different ones of the vibration sensors.

10. The apparatus of claim 1, wherein the control command comprises one or more of the following: select next song or channel; select previous song or channel; fast forward; fast backward; volume up; volume down; mute; release mute; answer phone; end call; select audio source; increase heating; decrease heating; activate navigation; deactivate navigation; select navigation target; show current location; turn on spoken feedback; turn off spoken feedback; switch on traffic announcements; switch off traffic announcements; and query currently effective traffic speed limits and/or parking rules.

11. A method comprising:
  receiving vibration information from a plurality of vibration sensors fixed to a steering wheel at given positions of the steering wheel; and
  determining, based on the received vibration information and expected propagation of vibration along the steering wheel, whether a user has caused vibration to the steering wheel and at which section of the steering wheel the vibration has been caused; wherein
  the section of the steering wheel where the vibration has been caused to the steering wheel is a touch section; and
  responsive to the determination of the touch section:
  determining a user command; and
  sending to a controllable device a control command corresponding to the user command.

12. The method of claim 11, wherein the vibration sensors are fixed to a rim of the steering wheel.

13. The method of claim 11, wherein the vibration sensors are positioned so that vibration from each different section of the steering wheel produces a unique combination of vibration information produced by the vibration sensors.

14. The method of claim 11, further comprising compensating by adaptive filtering noise caused by normal vibrations that are carried by the steering column to the steering wheel.

15. The method of claim 11, wherein the sections are defined relative to the orientation of the steering wheel.

16. The method of claim 11, wherein the sections are defined relative to a reference selected from a group consisting of: the body of a vehicle to which the steering wheel is installed; and gravitational field.

17. The method of claim 11, further comprising determining tapping of the steering wheel and the touch section based on time difference of arrival as measured by different ones of the vibration sensors.

18. The method of claim 11, wherein the control command comprises one or more of the following: select next song or channel; select previous song or channel; fast forward; fast backward; volume up; volume down; mute; release mute; answer phone; end call; select audio source; increase heating; decrease heating; activate navigation; deactivate navigation; select navigation target; show current location; turn on spoken feedback; turn off spoken feedback; switch on traffic announcements; switch off traffic announcements; and query currently effective traffic speed limits and/or parking rules.

19. A computer program product comprising a non-transitory computer readable medium having computer executable program code stored thereon, which when executed by at least one processor causes an apparatus at least to perform:
  receiving vibration information from a plurality of vibration sensors fixed to a steering wheel at given positions of the steering wheel; and
  determining, based on the received vibration information and expected propagation of vibration along the steering wheel, whether a user has caused vibration to the steering wheel and at which section of the steering wheel the vibration has been caused; wherein
  the section of the steering wheel where the vibration has been caused to the steering wheel is a touch section; and
  the computer readable medium further having computer executable program code stored thereon, which when executed by the at least one processor causes the apparatus at least to perform, responsive to the determination of the touch section:
  determining a user command; and
  sending to a controllable device a control command corresponding to the user command.

20. An apparatus comprising:
  means for receiving vibration information from a plurality of vibration sensors fixed to a steering wheel at given positions of the steering wheel; and
  means for determining, based on the received vibration information and expected propagation of vibration along the steering wheel, whether a user has caused vibration to the steering wheel and at which section of the steering wheel the vibration has been caused; wherein
  the section of the steering wheel where the vibration has been caused to the steering wheel is a touch section; and
  the apparatus further comprises means for, responsive to the determination of the touch section:
  determining a user command; and
  sending to a controllable device a control command corresponding to the user command.

* * * * *